United States Patent [19]
Heffelfinger et al.

[11] Patent Number: 5,500,282
[45] Date of Patent: Mar. 19, 1996

[54] HIGH MOISTURE BARRIER OPP FILM CONTAINING HIGH CRYSTALLINITY POLYPROPYLENE AND TERPENE POLYMER

[75] Inventors: Michael T. Heffelfinger, Fairport; Jay K. Keung, Macedon; Robert G. Peet, Pittsford, all of N.Y.

[73] Assignee: Mobil Oil Corporation, Fairfax, Va.

[21] Appl. No.: 272,990

[22] Filed: Jul. 15, 1994

[51] Int. Cl.⁶ ........................................ B32B 5/16
[52] U.S. Cl. .................. 428/339; 428/349; 428/516; 428/910; 156/244.11
[58] Field of Search .................... 428/516, 339, 428/910, 349; 156/244.11

[56] References Cited

U.S. PATENT DOCUMENTS

| | | | |
|---|---|---|---|
| 3,278,646 | 10/1966 | Lambert, Jr. | 260/897 |
| 3,937,762 | 2/1976 | Nahmias et al. | 260/889 |
| 4,230,767 | 10/1980 | Isaka et al. | 428/349 |
| 4,439,493 | 3/1984 | Hein et al. | 428/414 |
| 4,447,494 | 5/1984 | Wagner, Jr. et al. | 428/349 |
| 4,495,027 | 1/1985 | Wagner, Jr. et al. | 156/244.11 |
| 4,564,558 | 1/1986 | Touhsaent et al. | 428/349 |
| 4,564,559 | 1/1986 | Wagner, Jr. et al. | 428/349 |
| 4,565,739 | 1/1986 | Clauson et al. | 428/349 |
| 4,911,976 | 3/1990 | Park et al. | 428/216 |
| 4,961,992 | 10/1990 | Balloni et al. | 428/332 |
| 5,019,447 | 5/1991 | Keller | 428/327 |
| 5,057,177 | 10/1991 | Balloni et al. | 156/244.11 |
| 5,128,183 | 7/1992 | Buzio | 428/35.7 |
| 5,230,963 | 7/1993 | Knoerzer | 428/520 |

*Primary Examiner*—Edith Buffalow
*Attorney, Agent, or Firm*—Alexander J. McKillop; Dennis P. Santini; Laurence P. Hobbes

[57] ABSTRACT

An oriented film structure of improved water vapor transmission rate is prepared from an extruded and stretched mixture of (1) high crystallinity polypropylene (HCPP) having intermolecular stereoregularity greater than 93% and (2) a moisture barrier improving amount of polyterpene resin.

20 Claims, 1 Drawing Sheet

FIGURE
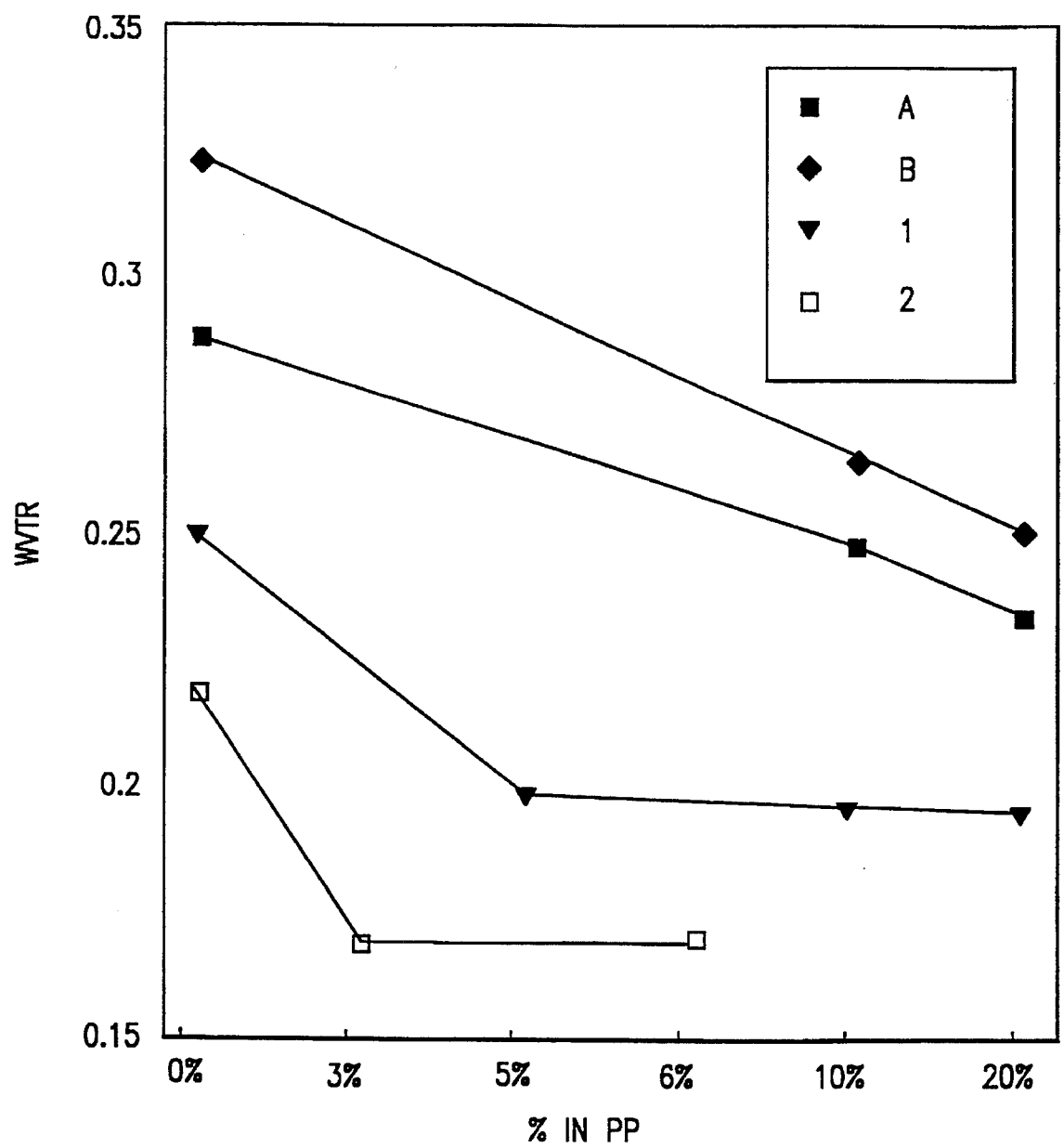

HIGH MOISTURE BARRIER OPP FILM CONTAINING HIGH CRYSTALLINITY POLYPROPYLENE AND TERPENE POLYMER

FIELD OF THE INVENTION

The present invention is concerned with oriented polypropylene film having high moisture barrier properties and its method of preparation.

BACKGROUND OF THE INVENTION

A constant problem in the packaging of commercial products, particularly those for human consumption, is how to protect the integrity of these products from damage caused by exposure to moisture. Oriented polypropylene (OPP) is known for its inherent moisture barrier properties. However, certain applications require even greater resistance to water vapor transmission to increase shelf-life. It is known to provide enhanced moisture barrier capability by techniques such as coating with polyvinylidene chloride (PVDC) as taught in U.S. Pat. Nos. 5,057,177; 5,019,447; and 4,961,992. However, such methods suffer from the need to provide a separate coating of the OPP. More significantly, efficient recycling of PVDC coated OPP can be difficult. Accordingly, it would be desirable to provide an OPP film of high moisture barrier properties which does not require a difficult to recycle separate coating. It would also be desirable for such high moisture barrier OPP film to be compatible with, or capable of, modification by coating processes. Such modifications include: improving oxygen barrier by applying PVOH coating; enhancing flavor and aroma protection by applying acrylic coating; improving machineability and capability for use in high speed horizontal form and fill applications by applying low temperature sealable coatings. U.S. Pat. No. 5,230,963 discloses enhancing oxygen barrier of films by a method involving a coating of poly(vinyl)alcohol.

It would also be useful to provide an OPP film of high moisture barrier properties which is susceptible of coextrusion with heat sealable layers to provide an ABA coextruded film.

U.S. Pat. Nos. 3,278,646 to Lambert and 4,230,767 to Isaka, et al. disclose oriented polypropylene films which contain terpene polymer which is primarily added to improve heat seal properties.

U.S. Pat. No. 3,937,762 to Nahmias, et al. discloses a resinous blend composition for films comprising a polypropylene containing a minor amount of terpene, e.g., alpha-pinene, beta-pinene or beta-phellandrene.

U.S. Pat. No. 5,128,183 to Buzio discloses films comprising a ternary mixture of (1) isotactic polypropylene; (2) high density polyethylene; and (3) a glassy, amorphous low molecular weight resin, e.g. terpene polymers. The resin is added at levels above 5 wt % to exert a compatibilizing effect on the blend of polypropylene and polyethylene providing a transparent film. The polyethylene component is added to facilitate mixing and homogeneity of the product.

Although it is known to add terpene polymers to certain polypropylenes for the purpose of improving heat seal, their use for improving moisture barrier characteristics in conventional OPP films has required relatively large amounts, say, 10 to 15 wt%, in order to be effective.

It is an object of the present invention to provide a packaging film material which exhibits high moisture barrier properties by blending low levels of terpene polymer into polypropylene core resin.

It is a further object of the present invention to provide an OPP film of high moisture barrier properties whose properties are further enhanced by the use of heat sealable layers, and/or coatings which improve oxygen barrier, flavor and aroma protection, machinability and applicability to high speed horizontal form and fill applications.

SUMMARY OF THE INVENTION

The present invention relates to a method for preparing a high moisture barrier oriented polypropylene film which comprises a) blending high crystallinity polypropylene (HCPP) having intermolecular stereoregularity greater than 93% with a moisture barrier improving amount of polyterpene resin to form a base layer precursor;

b) extruding the resulting base layer precursor to form a sheet; and c) stretching the sheet in both the longitudinal and the transverse directions to obtain the oriented film.

The present invention also relates to a biaxially oriented film structure of improved water vapor transmission rate comprising a mixture of (1) high crystallinity polypropylene (HCPP) having intermolecular stereoregularity greater than 93% and (2) a moisture barrier improving amount of polyterpene resin.

DESCRIPTION OF THE DRAWINGS

The FIGURE depicts a graph plotting water vapor transmission (WVTR) versus terpene polymer content for two oriented high crystallinity polypropylene films and two conventional OPP films.

DETAILED DESCRIPTION OF THE INVENTION

High Crystallinity Polypropylene (HCPP)

The present invention is prepared by blending high crystallinity polypropylene (HCPP) having intermolecular stereoregularity greater than 93% with a moisture barrier improving amount of polyterpene resin to form a base layer precursor. The high crystallinity polypropylene (HCPP) has intermolecular stereoregularity greater than 93%, preferably from 94 to 99%, more preferably from 94 to 98%. Suitable high crystallinity polypropylene (HCPP) resins (film grade) include Amoco 9117 and Amoco 9119, available from Amoco Chemical Co. of Chicago, Ill.; Chisso HF5010 and Chisso XF2805, available from Chisso Chemical Co., Ltd. of Tokyo, Japan. Suitable HCPPs are also available from Solvay in Europe. The high crystallinity polypropylene has a higher intermolecular stereoregularity, that is, an increase in isotactic polymer and decrease in atactic polymer. HCPP exhibits higher crystallinity than conventional polymers resulting in higher stiffness, surface hardness, lower deflection at higher temperatures and better creep properties. Further information relating to HCPP, including methods for preparation of the resin is disclosed in U.S. Pat. No. 5,063,264, incorporated herein by reference.

For purposes of the present invention, intermolecular stereoregularity can be determined by IR spectroscopy according to the procedure set out in "Integrated Infrared Band Intensity Measurement of Stereoregularity in Polypropylene," J. L. Koenig and A. Van Roggen, Journal of Applied Polymer Science, Vol. 9, pp. 359–367 (1965) and in Chemical Microstructure of Polymer Chains, Jack L. Koenig, Wiley-Interscience Publication, John Wiley and Sons, New York, Chichester, Brisbane, Toronto. Intermolecular steroregularity can also be determined by decalin solubility and NMR.

Terpene Polymer Component

The HCPP component can be blended with less than 10 wt%, preferably less than 7 wt %, e.g., 3 to 6 wt %, or even more preferably less than 5 wt %, say, 1 to 3 wt % of a polyterpene component. While not limiting the invention in any way, it is believed that the addition of the terpene polymer increases the extent of amorphous orientation (thereby restricting diffusion of water molecules) in the subsequent orientation step, particularly the tentering process wherein the film is transversely oriented, compared to that of an unblended HCPP film.

It has been found that the incorporation of terpene polymers at low levels in high crystallinity polypropylene provides a product film having significantly improved moisture barrier properties. Such films can be produced in accordance with the present invention having water vapor transmission rates less than or equal to 0.30, 0.25, 0.20, or even 0.17 g/100in$^2$/day/mil, as measured per ASTM F-372 at 100° F. and 90% relative humidity (RH).

The terpene polymers can be produced by polymerization and/or copolymerization of terpene hydrocarbons such as the monocyclic, and bicyclic monoterpenes and their mixtures, including allo-ocimene, carene, isomerized pinene, pinene, dipentene, terpinene, terinolene, limonene, turpentine, a terpene cut or fraction, and various other terpenes. The polymerization and/or copolyemrization may be followed by hydrogenation under pressure. Preferred terpene polymers are those selected from the group consisting of polymerized d-limonene, polymerized beta-pinene, or a polymerized synthetic approximation of d-limonene and beta-pinene and mixtures thereof. The preferred polyterpenes have a molecular weight of from about 800 to about 15,000M$_n$.

Film Structure

The basic structure of the moisture barrier film can be similar to those described in U.S. Pat. Nos. 4,447,494; 4,439,493; 4,495,027; 4,564,558; 4,564,559; 4,565,739; and 4,911,976; the disclosures of which are incorporated herein by reference in its entirety. The present invention, however, uses high crystallinity polypropylene as the polyolefin in the core material. In one embodiment of the present invention, an oriented multi-layer film structure comprises coextruded layers of (a) a base layer comprising high crystallinity polypropylene (HCPP) having intermolecular stereoregularity greater than 93% with a moisture barrier improving amount of polyterpene resin and (b) a heat-sealable skin layer comprising a polyolefin of comparatively low stereoregularity on at least one surface of (a). The skin layers can optionally contain a slip additive and/or an antiblock material chosen from those suitable for such products. Skin layers can range from about 0.5–5 microns in thickness.

The comparatively low stereo regular polyolefin polymers contemplated as the skin materials of such a multilayer system include, for example, ethylene-propylene random copolymers and ethylene-propylene-butene-1 terpolymers. Preferred terpolymers are ethylene-propylene-butene-1 terpolymers having 1–5 wt % ethylene and 1–15 wt % butene-1.

Multi-layer films of the present invention can be prepared employing commercially available systems for coextruding resins. The HCPP blended with the selected polyterpene can be coextruded with an ethylene-propylene-butene-1 terpolymer. The polymers can be brought to the molten state and coextruded from a conventional extruder through a flat sheet die, the melt streams being combined in an adapter prior to being extruded from the die. After leaving the die orifice, the multi-layer film structure is chilled and the quenched sheet then reheated and oriented.

The film is biaxially oriented. Biaxially oriented film can be stretched 4.5 to 6 times in the machine direction (MD), and 6 to 13 times in the transverse direction (TD). The overall orientation (MD X TD) can range from about 25 to 80. After orientation, the edges of the film can be trimmed and the film wound onto a core.

Moisture barrier capability can be further enhanced by techniques such as coating the film with polyvinylidene chloride (PVDC) as taught in U.S. Pat. Nos. 5,057,177; 5,019,447; and 4,961,992. In addition, oxygen barrier can be enhanced by the application of a PVOH coating, as described in U.S. Pat. No. 5,230,963, while flavor and aroma protection are improved by applying acrylic coating by conventional procedures. A low temperature sealable coating as known in the art can be applied in order to provide machinability and high speed horizontal form and fill applications. A particularly preferred embodiment comprises a coextruded ABA multilayer film structure wherein A represents a heat sealable layer and B represents the high crystallinity polypropylene as discussed above. All of the above U.S. patents are incorporated herein by reference.

The resulting film structures of the invention may have a thickness ranging from 0.25 to 10 mils, e.g., 1 to 2.2 mils or 0.45 to 1 mil.

The following examples will illustrate the invention.

EXAMPLE A (Comparative)

A conventional polypropylene, Exxon 4612, available from Exxon Chemical Co. of Houston, TX and blends thereof containing 10 wt % and 20 wt % terpene polymer comprising dlimonene (Piccolyte C-115 obtainable from Hercules Corporation) added by melt blending were coextruded with Fina 8573, available from Fina Oil & Chemical Co., Chemical Div., Dallas, Tex. This combination was coextruded and oriented so as to have outer skin layer dimensions of 0.6 micron and a core layer dimension of 20 microns. The resulting film was tested for moisture barrier by determining WVTR, g1/100 in$^2$/day/mil, at 100° F., 90% relative humidity (RH) for 24 hours (ASTM F 372).

EXAMPLE B (Comparative)

A conventional polypropylene, Fina 3371, available from Fina Oil and Chemical Co. of Dallas, Tex. and blends thereof containing 10 wt % and 20 wt % terpene polymer comprising d-limonene (Piccolyte C-115 obtainable from Hercules Corporation) added by melt blending were coextruded with Fina 8573 which is an ethylene-propylene random polymer containing 3.5 wt % ethylene. This combination was coextruded and oriented so as to have outer skin layer dimensions of 0.6 micron and a core layer dimension of 20 microns. The resulting film was tested for moisture barrier by determining WVTR, g/100 in$^2$/day/mil, at 100° F., 90% RH for 24 hours (ASTM F 372).

EXAMPLE 1

A high crystallinity polypropylene, Amoco 9117, available from Amoco Chemical Co. of Chicago, Ill. and blends thereof containing 0 wt %, 5 wt %, 10 wt % and 20 wt % terpene polymer comprising d-limonene (Piccolyte C-115 obtainable from Hercules Corporation) added by melt blending were coextruded with Fina 8573. This combination was coextruded and oriented so as to have outer skin layer dimensions of 0.6 micron and a core layer dimension of 20 microns. The resulting film was tested for moisture barrier by determining WVTR, g/100 in$^2$/day/mil, at 100° F., 90% RH for 24 hours (ASTM F 372).

EXAMPLE 2

High crystallinity polypropylene, Amoco 9117, available from Amoco Chemical Co. of Chicago, Ill. and blends thereof containing 0 wt %, 3 wt %, and 6 wt % terpene polymer comprising d-limonene (Piccolyte C-115 obtainable from Hercules Corporation) added by melt blending were extruded and oriented so as to have a core layer dimension of 20 microns. The resulting film was tested for moisture barrier by determining WVTR, g/100 in$^2$/day/mil, at 100° F., 90% RH for 24 hours (ASTM F 372).

The results of the water vapor transmission measurements (g/100 in$^2$/day/mil at 100° F., 90% relative humidity) in the foregoing Examples are set out in the Table below, and the Figure which depicts WVTR vs. wt % terpene polymer in the OPP. The results show a 40% reduction in water vapor transmission rate for the blends of the present invention compared to conventional polypropylenes.

TABLE

| Ex. | Structure | 0% | 3% | 5% | 6% | 10% | 20% |
|---|---|---|---|---|---|---|---|
| A | ABA* | 0.29 | | | | 0.25 | 0.24 |
| B | ABA* | 0.325 | | | | 0.27 | 0.25 |
| 1 | ABA* | 0.25 | | 0.2 | | 0.2 | 0.2 |
| 2 | B | 0.22 | 0.17 | | 0.17 | | |

*A = EP Random Copolymer or EPB Random Terpolymer
B = PP Homopolymer

It will be apparent to those skilled in the art that the specific embodiments discussed above can be successfully repeated with ingredients equivalent to those generically or specifically set forth above and under variable process conditions. From the foregoing specification, one skilled in the art can readily ascertain the essential features of this invention and without departing from the spirit and scope thereof can adapt it to various diverse applications.

It is claimed:

1. A method for preparing a moisture barrier oriented polypropylene film which comprises
    a) blending high crystallinity polypropylene (HCPP) having intermolecular stereoregularity greater than 93% with a moisture barrier improving amount of polyterpene resin to form a base layer precursor;
    b) extruding the resulting base layer precursor to form a sheet; and
    c) stretching the sheet in both the longitudinal and the transverse directions to obtain the oriented film.

2. The method of claim 1 wherein said film consists essentially of HCPP and polyterpene resin.

3. The method of claim 1 wherein said base layer precursor is coextruded with a skin-forming material which is a polyolefin of comparatively low stereoregularity having a melt flow rate ranging from 1 to 25.

4. The method of claim 3 wherein said polyolefin is selected from the group consisting of i) ethylene-propylene-butene-1 terpolymers having 1–5 wt % ethylene and 1–15 wt % butene-1, and ii) ethylene-propylene random copolymers.

5. The method of claim 1 wherein said high crystallinity polypropylene (HCPP) has intermolecular stereoregularity ranging from 94 to 98% and said film exhibits a water vapor transmission rate of less than or equal to 0.25 g/100 in$^2$/day/mil.

6. The method of claim 1 wherein said moisture barrier improving amount of polyterpene resin is less than 10 wt %, said polyterpene resin is selected from the group consisting of polymerized d-limonene, polymerized beta-pinene, and a polymerized synthetic approximation of d-limonene and beta-pinene, and said film exhibits a water vapor transmission rate of less than or equal to 0.20 g/100 in$^2$/day/mil.

7. The method of claim 1 wherein said moisture barrier improving amount of polyterpene resin is less than 7 wt %, said polyterpene resin comprises polymerized d-limonene, and said film exhibits a water vapor transmission rate of less than or equal to 0.17 g/100 in$^2$/day/mil.

8. The method of claim 1 wherein said moisture barrier improving amount of polyterpene resin is less than 5 wt %, and said polyterpene resin comprises polymerized d-limonene.

9. The method of claim 1 wherein said film is biaxially oriented film by stretching 4.5 to 6 times in the machine direction (MD), and 6 to 13 times in the transverse direction (TD), with an overall orientation (MD×TD) ranging from 25 to 80.

10. A biaxially oriented film structure of improved water vapor transmission rate comprising an extruded and stretched mixture of (1) high crystallinity polypropylene (HCPP) having intermolecular stereoregularity greater than 93% and (2) a moisture barrier improving amount of polyterpene resin.

11. The film structure of claim 10 consisting essentially of HCPP and polyterpene resin.

12. The film structure of claim 10 which is coextruded with a skin-forming material which is a polyolefin of comparatively low stereoregularity having a melt flow rate ranging from 1 to 25.

13. The film structure of claim 12 wherein said polyolefin is selected from the group consisting of i) ethylene-propylene-butene-1 terpolymers having 1–5 wt % ethylene and 1–15 wt % butene-1, and ii) ethylene-propylene random copolymers.

14. The film structure of claim 10 wherein said high crystallinity polypropylene (HCPP) has intermolecular stereoregularity ranging from 94 to 98% and said film exhibits a water vapor transmission rate of less than or equal to 0.25 g/100 in$^2$/day/mil.

15. The film structure of claim 10 wherein said moisture barrier improving amount of polyterpene resin is less than 10 wt %, said polyterpene resin is selected from the group consisting of polymerized d-limonene, polymerized beta-pinene, and a polymerized synthetic approximation of d-limonene and beta-pinene, and said film structure exhibits a water vapor transmission rate of less than or equal to 0.20 g/100 in$^2$/day/mil.

16. The film structure of claim 10 wherein said moisture barrier improving amount of polyterpene resin is less than 7 wt %, said polyterpene resin comprises polymerized d-limonene, and said film exhibits a water vapor transmission rate of less than or equal to 0.17 g/100 in$^2$/day/mil.

17. The film structure of claim 10 wherein said moisture barrier improving amount of polyterpene resin is less than 5 wt %, and said polyterpene resin comprises polymerized d-limonene.

18. The film structure of claim 10 which is biaxially oriented by stretching 4.5 to 6 times in the machine direction (MD), and 6 to 13 times in the transverse direction (TD), with an overall orientation (MD×TD) ranging from 25 to 80, and having a thickness ranging from 0.25 to 10 mils.

19. The film structure of claim 10 which is biaxially oriented by stretching 4.5 to 6 times in the machine direction (MD), and 6 to 13 times in the transverse direction (TD), with an overall orientation (MD×TD) ranging from 25 to 80, and having a thickness ranging from 1 to 2.2 mils.

20. The film structure of claim 10 having a thickness ranging from 0.45 to 1 mil.

* * * * *